(12) United States Patent
Tsumura

(10) Patent No.: US 7,007,182 B1
(45) Date of Patent: Feb. 28, 2006

(54) COMMUNICATION TERMINAL AND FACSIMILE APPARATUS CONNECTED TO AN ANALOG COMMUNICATION NETWORK AND PROVIDED WITH A POWER MANAGEMENT FEATURE

(75) Inventor: Naoki Tsumura, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 411 days.

(21) Appl. No.: 09/667,732

(22) Filed: Sep. 22, 2000

(30) Foreign Application Priority Data

Sep. 22, 1999 (JP) .................................. 11-269366

(51) Int. Cl.
*G06F 1/32* (2006.01)

(52) U.S. Cl. ..................................... 713/324

(58) Field of Classification Search ................ 713/320, 713/1, 300, 324
See application file for complete search history.

(56) References Cited

U.S. PATENT DOCUMENTS

| | | | | |
|---|---|---|---|---|
| 4,656,318 A | * | 4/1987 | Noyes .................... | 379/102.04 |
| 5,369,666 A | | 11/1994 | Folwell et al. | |
| 5,636,273 A | * | 6/1997 | Schopfer et al. ............. | 379/412 |
| 5,644,594 A | | 7/1997 | Johnson et al. | |
| 5,796,815 A | * | 8/1998 | Guercio et al. ............. | 379/372 |
| 5,910,978 A | * | 6/1999 | Maytal et al. ........... | 379/93.01 |
| 6,167,078 A | * | 12/2000 | Russo ........................ | 375/222 |
| 6,445,733 B1 | * | 9/2002 | Zuranski et al. ............ | 375/231 |

FOREIGN PATENT DOCUMENTS

| | | |
|---|---|---|
| EP | 576882 A2 | 1/1994 |
| JP | 61257049 A | * 11/1986 |
| JP | 698038 | 4/1994 |

OTHER PUBLICATIONS

"Technique for Monitoring a Computer System's Activity for the Purpose of Power Management of a DOS-Compatible System". IBM Technical Disclosure Bulletin. Sep. 1990. vol. 33, Issue 4. pp. 474-477.*

* cited by examiner

*Primary Examiner*—Lynne H. Browne
*Assistant Examiner*—Eric Chang
(74) *Attorney, Agent, or Firm*—Cooper & Dunham LLP

(57) ABSTRACT

A communication terminal apparatus connected to an analog communication network includes a line interface circuit, a digital signal processing circuit provided with a network control signal processing section and a modulation and demodulation processing section, and a power-saving control device to carry on the operation of the line interface circuit and the network control signal processing section and suspend the operation of the modulation and demodulation processing section so as to be into a power-saving state when a predetermined power-saving state change factor has occurred in a normal operating state, and resume the suspended operation of the modulation and demodulation processing section when an incoming call signal is received during the power-saving state.

15 Claims, 5 Drawing Sheets

COMMUNICATION TERMINAL AND FACSIMILE APPARATUS CONNECTED TO AN ANALOG COMMUNICATION NETWORK AND PROVIDED WITH A POWER MANAGEMENT FEATURE

BACKGROUND

1. Field

This patent specification relates to a communication terminal and facsimile apparatus, and more particularly to a communication terminal and facsimile apparatus connected to an analog communication network and provided with a power management feature.

2. Background

With the rapid growth in data communication, including the Internet, small portable communication terminals have came into wide use. When a communication terminal is connected to an analog communication network, such as a public switched telephone network (PSTN), electrical isolation between the network and the internal circuitry of the terminal is needed for protecting against damage to the circuitry in the terminal caused by surge voltage, penetration of common mode noise, etc. A relatively massive isolation transformer has been used for such purposes for a long time.

Such an isolation transformer should convert an input voltage to an output voltage without distortion of a signal waveform. However, in practice factors such as distortion of an electromagnetic characteristic of the iron core of the transformer, can distort the output voltage. Further, as an isolation transformer is miniaturized, such distortion tends to increase.

Further, there has been a rapid increase in data transmission rates in analog communication networks. Consequently, there is a greater need to reduce distortion of a transmission signal in order to achieve higher data rate transmission. That is, the need has been growing for further reduction in distortion of an analog transmission signal, and the need for further miniaturization of an isolation transformer also has been increasing.

More recently, isolation in the analog signal region is being supplanted by isolation technology in a digital signal region, in parallel with rapid progress of semiconductor and insulating material technology. In digital isolation technology, an analog signal received from an analog communication network is first converted into a digital signal at a line interface circuit, and the converted digital signal is used for electrical isolation in the digital signal region. Similarly, transmitting digital data is isolated in the digital signal region, and the isolated digital data is converted into an analog signal and then transmitted to the analog communication network.

As an example, Japanese Laid-Open Patent Application No. 6-98038 discusses a modem with digital isolation that eliminates the need for a relatively large and heavy isolation transformer from a data access arrangement (DAA) and substitutes two relatively small pulse transformers between an integrated analog circuit and a digital signal processor to eliminate analog distortion.

When electrical isolation is achieved in a digital signal region, allowable signal distortion is larger than that achieved in an analog signal region, and therefore a relatively small isolation device, such as a pulse transformer, a photocoupler, etc., can be used. As another example of a small isolating device in a digital signal region, an isolation circuit having a combination of electric capacitors and semiconductor devices is also used. Isolation in a digital signal region eliminates the need for a large and expensive isolation transformer, thereby reducing the size and cost of a communication terminal connected to an analog communication network.

Another pertinent consideration is to reduce the power consumption of a communication terminal, such as a facsimile apparatus. For example, to reduce power consumption, a facsimile apparatus may provide a power-saving state in which electric circuits other than a monitoring circuit are placed in a waiting state or idling state. In the waiting state, the monitoring circuit monitors an incoming call received from the connected network and a manual instruction input by an operator of the apparatus.

In a communication terminal providing digital isolation, a modulated analog communication signal received from a connected network is first converted into a digital signal by a line interface circuit as described earlier. The converted digital signal is transmitted to a digital signal processing circuit, such as a digital signal processor (DSP), after passing through a digital isolation interface circuit. Through processing by the digital signal processing circuit, the transmitted digital signal is demodulated, i.e., reconstituted into original data, i.e., data before being modulated at a sending terminal, and the demodulated data is transmitted to a next stage.

Conversely, transmitting data received from a preceding stage is modulated by the digital signal processing circuit, and the modulated data is transmitted to the line interface circuit after passing through the digital isolation interface circuit. Then the modulated digital data is converted into an analog signal as a modulated communication signal, and the modulated communication signal is sent out toward a receiving terminal via the connected analog communication network.

The above described digital signal processing circuit also receives network monitoring signals, such as an incoming call detection signal, an inverting polarity detection signal, a busy tone detection signal, etc., from the line interface circuit via the digital isolation interface circuit. The digital signal processing circuit informs a following processor, such as a main controller, of the received monitoring signals. Further, the digital signal processing circuit responds to the received monitoring signals with an acknowledgment signal, as necessarily.

Accordingly, the digital signal processing circuit needs to be supplied with electrical power and in operation for receiving the network monitoring signals even in a power-saving state during a waiting state or an idling state of the communication terminal.

When the digital signal processing circuit is in operation, the digital signal processing circuit consumes a relatively large quantity of electric power due to a high speed digital signal processing capability executed by large scale circuitry for modulating and demodulating operations at a modulation and demodulation section.

Consequently, in communication terminals including facsimile apparatuses having isolation in a digital signal region, a power-saving function is not always fully effective because substantial amount of power is consumed by the digital signal processing circuit in a power-saving mode at a waiting state of the communication terminal.

SUMMARY

In view of the above-discussed and other problems, an object of the present disclosure is to provide a novel communication terminal and facsimile apparatus connected to an analog communication network provided with isolation in a digital signal region that can reduce power consumption.

To achieve these and other objects, the present disclosure provides a novel communication terminal apparatus connected to an analog communication network that includes a line interface circuit to control the network, convert analog data of network control and monitor signals and a modulated signal received from the network into digital data, and convert digital data including a modulated signal transmitting to the network into analog data. The apparatus also includes a digital signal processing circuit provided with a network control signal processing section and a modulation and demodulation processing section, and a digital interface device to electrically isolate the network control and monitor signals and the modulated digital signals. The apparatus further includes a power-saving control device to carry out the operation of the line interface circuit and the network control signal processing section and suspend the operation of the modulation and demodulation processing section so as to be into a power-saving state when a predetermined power-saving state transit factor has occurred in a normal operating state, and resume the suspended operation of the modulation and demodulation processing section when an incoming call signal is received during the power-saving state.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF PREFERRED EMBODIMENTS

Figure 1:
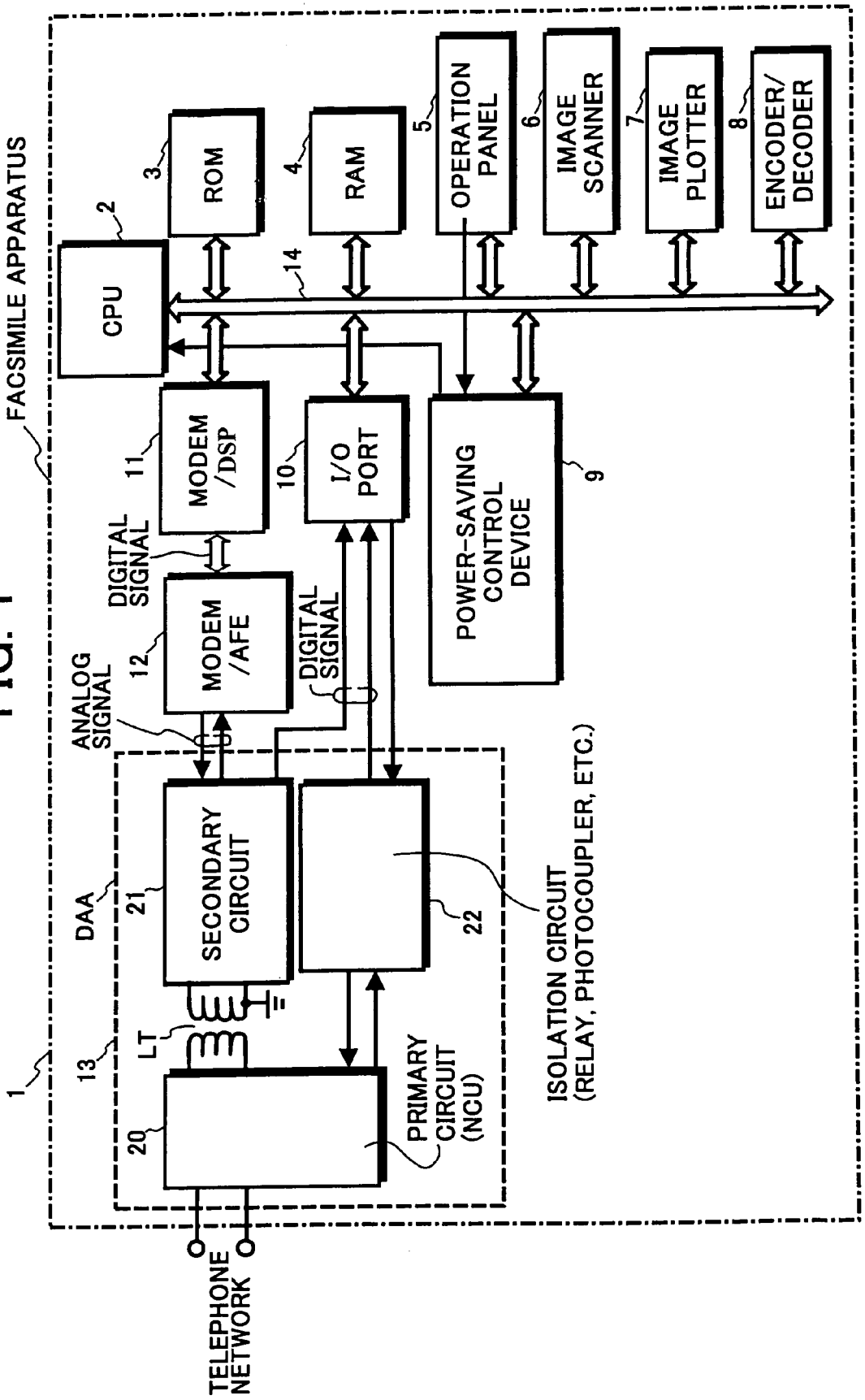
FIG. 1 is a block diagram illustrating an exemplary facsimile apparatus having an isolation transformer.

Referring now to the drawings, wherein like reference numerals designate identical or corresponding parts throughout the several views, FIG. 1 is a block diagram illustrating an exemplary facsimile apparatus 1 having an isolation transformer LT. The facsimile apparatus 1 includes a central processing unit (CPU) 2, a read-only memory (ROM) 3, a random access memory (RAM) 4, an operation panel 5, an image scanner 6, an image plotter 7, and an encoder/decoder 8.

The facsimile apparatus 1 also includes a power-saving control device 9, an input and output port (I/O port) 10, a modem and digital signal processor (modem/DSP) 11, a modem analog front end (modem/AFE) 12, a data access arrangement (DAA) 13, and a system bus 14. The CPU 2, the ROM 3, the RAM 4, the operation panel 5, the image scanner 6, the image plotter 7, the encoder/decoder 8, the power-saving control device 9, the I/O port 10, and the modem/DSP 11 are interconnected via the system bus 14.

The CPU 2 controls the other devices in the facsimile apparatus 1 according to programs or instruction codes stored in the ROM 3 to perform a predetermined facsimile communication operation. The RAM 4 functions as a working memory of the CPU 2, i.e., the RAM 4 stores various data such as control parameters for driving devices and elements in the facsimile apparatus 1, temporary data required for program execution by the CPU 2, etc.

The operation panel 5 displays a status of the facsimile apparatus 1, operation guidance, etc., and inputs instructions to operate the facsimile apparatus 1. The image scanner 6 scans a sending document and generates digital image information. The image plotter 7 forms and outputs an image on a sheet of paper according to received facsimile information.

The encoder/decoder 8 encodes image information of a sending document, which is read by the image scanner 19, into compressed image information. The encoder/decoder 8 also decodes received compressed image information into decompressed image information. The encoder/decoder 8 may also be referred as a coder.

The modem/DSP 11 modulates data sent from the CPU 2, which is sending facsimile data, into modulated digital data by using digital arithmetic and/or logical operation and transmits the modulated digital data to the modem/AFE 12. The modem/DSP 11 also demodulates modulated digital data sent from the modem/AFE 12 into demodulated data also by using digital arithmetic and/or logical operation and sends the demodulated data to the CPU 2 as received facsimile information.

The modem/AFE 12 converts modulated digital data into an analog modulated signal and also converts an analog modulated signal into modulated digital data.

The data access arrangement (DAA) 13, which is also referred as a line interface circuit, includes a primary circuit 20, a secondary circuit 21, an isolation circuit 22, and an isolation transformer or a line transformer denoted by LT. The primary circuit 20 is connected to a telephone network, the line transformer LT, and the isolation circuit 22. The primary circuit 20 functions as a network control unit (NCU). The line transformer LT electrically isolates the telephone network and the internal circuitry of the facsimile apparatus 1 in an analog signal region.

The secondary circuit 21 is disposed between the line transformer LT and the modem/AFE 12. The isolation circuit 22 can be, for example, an electromagnetic relay, a photocoupler, etc. The isolation circuit 22 also electrically isolates the telephone network and the internal circuitry of the facsimile apparatus 1.

The I/O port 10 transmits network control and monitor signals to the primary circuit 20 and also receives network control and monitor signals and the modulated digital signals from the primary circuit 20. Examples of the network control signals such as an incoming call detection signal, a busy tone detection signal, an inverting polarity detection signal, a control signal to make and break a relay of the line loop, etc., are received and transmitted by the I/O port 10. As stated above, the signals transmitted between the primary circuit 20 and the I/O port 10 are electrically isolated by the isolation circuit 22.

The power-saving control device 9 controls power consumption of the facsimile apparatus 1. When the facsimile apparatus 1 is in a waiting state or out of use for a predetermined period, the power-saving control device 9 signals the CPU 2 to change the state of the facsimile apparatus 1 into in a power-saving state. In other words, when the facsimile apparatus 1 is not in a receiving operation of a facsimile massage, a transmitting operation of a facsimile massage, or an instruction inputting operation via the operation panel 5 for a predetermined period, the CPU 2 changes the state of the facsimile apparatus 1 into a power-saving state.

In the power-saving state, the CPU 2 shuts of supplying power, or halts an operating clock signal to devices in the facsimile apparatus 1 that need not be operated during the power-saving state. For example, a backlight of the display of the operation panel 5, the image scanner 6, the image plotter 7, the encoder/decoder 8, the modem/DSP 11, the modem/AFE 12, etc., are shut off from being powered or supplied with operating clocks. In other words, the operation of those devices is suspended, and therefore the power consumption is reduced.

During the power-saving state, the CPU 2 transfers the control of those devices under the power-saving control device 9. The power-saving control device carries on the operation of the line interface circuit (i.e., DAA 13), the power-saving control device 9 and the I/O port 10, etc., during the power-saving state.

During the power-saving state, the CPU 2 waits for a return-to-normal operating state signal from the power-saving control device 9. The return-to-normal operating state signal is transmitted to the CPU 2 as an interrupt request signal, which is independent from the system bus 14, i.e., the interrupt request signal does not use the system bus 14.

During the power-saving state, when the power-saving control device 9 detects a parameter indicative of a return-to-normal operating state, such as an incoming call detection signal from the DAA 13, a key input signal from the operation panel 5, etc., the power-saving control device 9 generates an active interrupt request signal as a return-to-normal operating state signal to the CPU 2.

When the interrupt request signal becomes active, the CPU 2 resumes supplying power or operating clock to the suspended devices, i.e., devices in power saving, such as a backlight of the display of the operation panel 5, the image scanner 6, the image plotter 7, the encoder/decoder 8, the modem/DSP 11, the modem/AFE 12, etc., and thus the facsimile apparatus 1 returns to the normal operating state.

Figure 2:
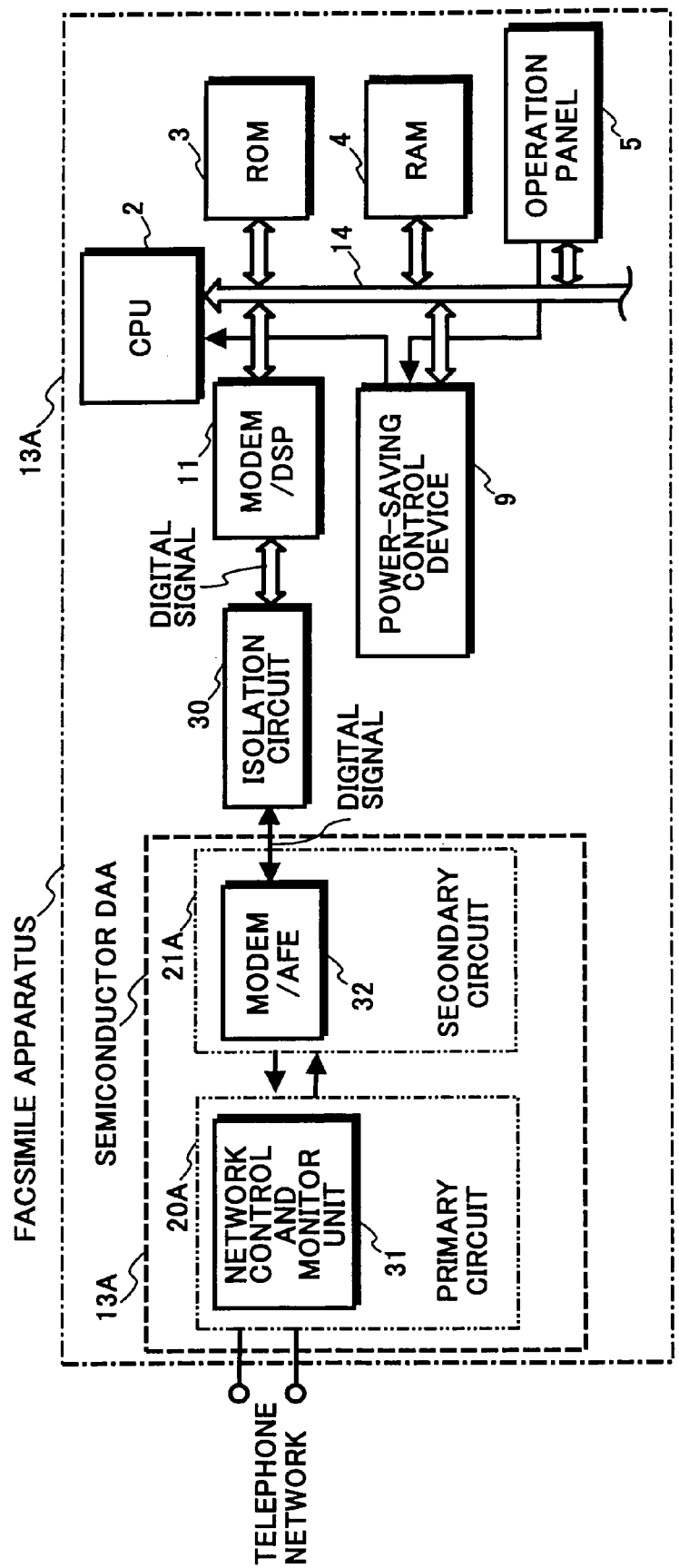
FIG. 2 is a block diagram illustrating an exemplary facsimile apparatus without a large isolation transformer.

FIG. 2 is a block diagram illustrating an exemplary facsimile apparatus 1A without a line transformer or an isolation transformer. Referring to FIG. 2, the devices that are substantially the same as those in FIG. 1 are denoted by the same reference numerals, and a repeated description of those operational steps is not provided.

Referring to FIG. 2, the facsimile apparatus 1A includes a random access memory (RAM) 4, an operation panel 5, a power-saving control device 9, a modem/DSP 11, a semiconductor data access arrangement (DAA) 13A, and an isolation circuit 30. Further, the facsimile apparatus 1A includes an image scanner, an image plotter, and an encoder/decoder, however those devices are substantially the same as those in the facsimile apparatus 1 of FIG. 1 and therefore those devices are not illustrated.

The semiconductor DAA 13A is also referred as a line interface circuit and includes a primary circuit 20A and a secondary circuit 21A, but does not use a relatively large isolation device, such as the line transformer LT of FIG. 1, to electrically isolate in an analog signal region. The primary circuit 20A includes a network control and monitor unit 31, and is connected to the telephone network. The network control and monitor unit 31 functions as a network control unit (NCU). The secondary circuit 21A includes a modem analog front end (modem/AFE) 32.

The modem/DSP 11 modulates data received from the CPU 2 into modulated digital data, which is in a parallel data format in this example. The modem/DSP 11 then converts the modulated digital data in the parallel data format into serial data, and transmits the serial data to the isolation circuit 30. The modem/DSP 11 also receives modulated serial data from the isolation circuit 30, and converts the serial data into parallel data. The modem/DSP 11 demodulates the modulated data into demodulated data, and sends the demodulated data to the CPU 2 as received facsimile information. For practicing the above described serial to parallel and parallel to serial data conversion, the modem/DSP 11 may provide a serial to parallel and parallel to serial data converter.

The modem/AFE 32 converts a digital signal received from the modem/DSP 11 via the isolation circuit 30 into an analog signal to send the converted data to the telephone network via the primary circuit 20A. The modem/AFE 32 also converts an analog signal received from the primary circuit 20A into a digital signal to send the converted data to the modem/DSP 11 via the isolation circuit 30.

The isolation circuit 30 electrically isolates the telephone network and the internal circuitry of the facsimile apparatus 1A in a digital signal region. The isolation circuit 30 may comprise, for example, a pulse transformer, a photocoupler, etc, and therefore the isolation circuit 30 can be relatively small and have a relatively low cost. The data passes through the isolation circuit 30 in a serial data transmission manner, so that the isolation circuit 30 can use a single isolating device and thereby the isolation circuit 30 can be further reduced in size and cost.

In addition to the facsimile data transmission between the modem/AFE 32 and the modem/DSP 11, network control signals sent to and received from the network control and monitor unit 31 pass through the isolation circuit 30 in the serial data transmission manner. Further, the modem/DSP 11 has a circuit to relay network control and monitor signals transmitted between the network control and monitor unit 31 and the CPU 2. As a part of the transmission path of the control and monitor signals between the modem/DSP 11 and the CPU 2, the system bus 14 may be used.

The facsimile apparatus 1A of FIG. 2 can be made smaller and less expensively than the facsimile apparatus 1 of FIG. 1. However, unless the modem/DSP 11 is supplied with electric power, the modem/DSP 11 cannot relay the above-described network control and monitor signals, such as an incoming call detection signal, to the CPU 2. Accordingly, even when the facsimile apparatus 1A is in the power-saving state, the modem/DSP 11 has to be supplied with electric power to relay the network control and monitor signals including an incoming call detection signal to the CPU 2 to invoke a receiving operation of the information corresponding to the incoming call.

However, if the whole circuit of the modem/DSP 11 is supplied with electric power in the power-saving state, a portion of the modem/DSP 11 where the modulating and demodulating operations are performed, consumes a certain amount of electric power.

Figure 3:
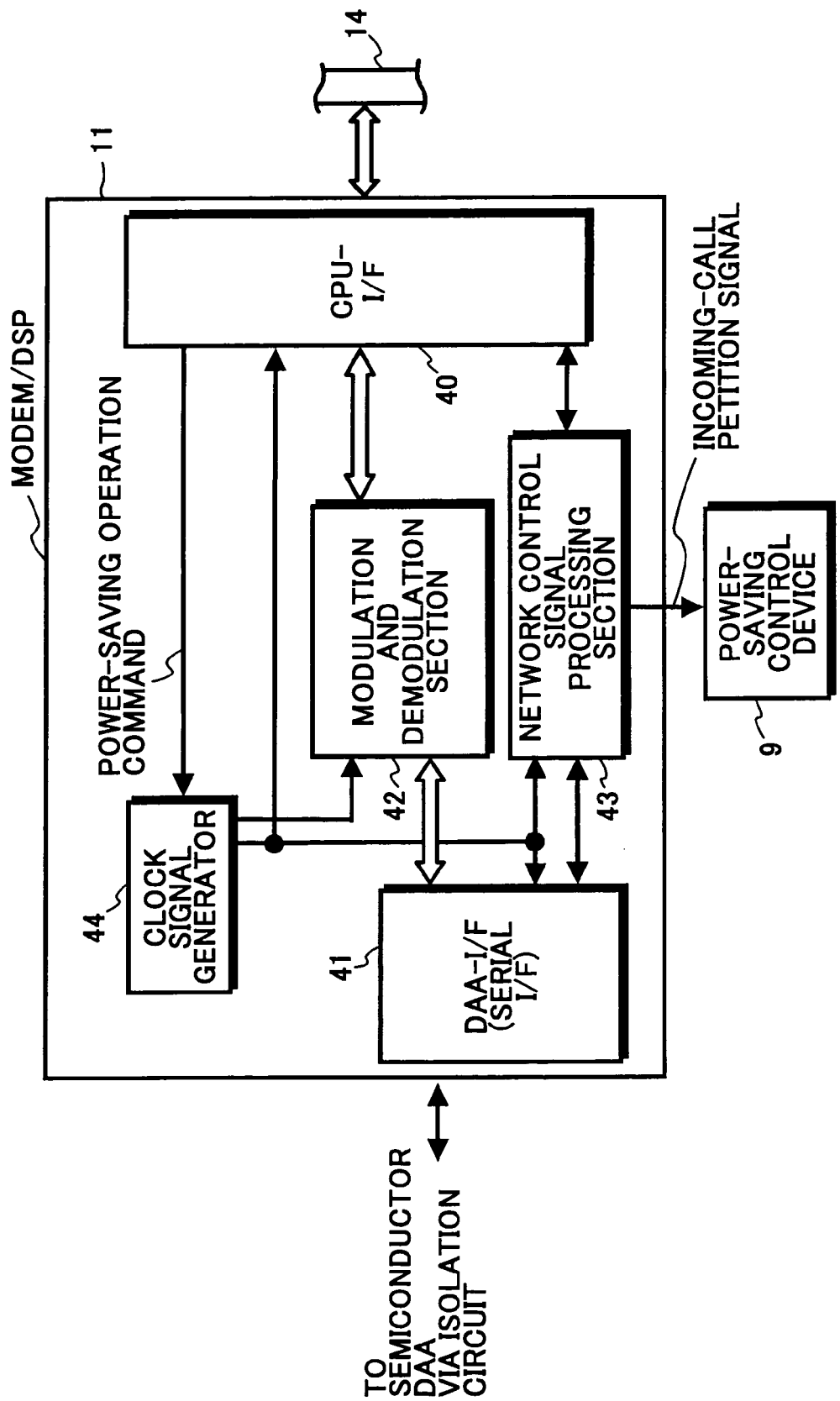
FIG. 3 is a block diagram illustrating an exemplary modem and digital signal processor (modem/DSP) of FIG. 2 configured according to preferred embodiments.

FIG. 3 is a block diagram illustrating an exemplary modem and digital signal processor (modem/DSP) 11 of FIG. 2 configured according to the present invention. Referring to FIG. 3, the modem/DSP 11 includes a CPU interface (CPU-I/F) 40 that interfaces with the CPU 2 of FIG. 2 via the system bus 14, a DAA interface (DAA-I/F) 41 that interfaces with the network control and monitor unit 31 of FIG. 2 via the isolation circuit 30, etc., a modulation and demodulation section 42, a network control signal processing section 43, and a clock signal generator 44.

The CPU-I/F 40, the DAA interface (DAA-I/F) 41, the modulation and demodulation section 42, and the network control signal processing section 43 are clocked with a clock signal generated by the clock signal generator 44.

When the facsimile apparatus 1A is in a power-saving state, the CPU-I/F 40, the DAA interface (DAA-I/F) 41, and the network control signal processing section 43 are required to be in operation; however, operation of the modulation and demodulation section 42 is not required. Accordingly, the clock signal generator 44 generates independently two channels of clock signals, one is used for supplying the CPU-I/F 40, the DAA interface (DAA-I/F) 41, and the network control signal processing section 43, and the other is used for supplying the modulation and demodulation section 42.

The clock signal supplied to the modulation and demodulation section 42 is halted and resumed according to a power-saving operation command, which is provided by the CPU 2 through the CPU-I/F 40. For example, the clock signal generator 44 may have a two-input logical AND gate, and when one of the two inputs is connected to the generated clock signal and the other input is connected to the power-saving operation-command. Thus, the output terminal of the AND gate connected to the modulation and demodulation section 42 follows the power-saving operation command.

When the facsimile apparatus 1A transitions to a power-saving mode, the CPU 2 generates a power-saving operation command to halt the clock signal supplied to the modulation and demodulation section 42. Thereby, the operation of the modulation and demodulation section 42 is suspended or halted, and thus the power consumption at the modulation and demodulation section 42 is suppressed.

When the modem/DSP 11 is made of a complementary metal oxide semiconductor (CMOS) circuit, the consumption power of the circuit is approximately proportional to the operating clock speed. Therefore, when the clock signal supplied to the modulation and demodulation section 42 is halted, the consumption power thereof becomes close to zero. In addition, the halting and resuming operation of the clock signal does not cause a malfunction of the circuit, i.e., the circuit of the modem/DSP 11 can operate in a stable manner.

Further, instead of halting the clock signal to the modulation and demodulation section 42, the CPU 2 may shut off the electric power supplyied to the modulation and demodulation section 42. This method also suppresses power consumption of the modem/DSP 11 at the power-saving state.

When the facsimile apparatus 1A is in a power-saving state and an incoming call arrives, because the CPU-I/F 40, the DAA interface (DAA-I/F) 41, and the network control signal processing section 43 are powered and in operation, the network control signal processing section 43 can detect the arrival of the incoming call being sent from the semiconductor DAA 13A via the DAA-I/F 41. Then, the network control signal processing section 43 can notify the CPU 2 of the arrival of the incoming call via the CPU-I/F 40. Thus, the CPU 2 can change the facsimile apparatus 1A back to the normal operating state by resuming supplying the clock signal to the suspended modulation and demodulation section 42 to prepare for receiving and demodulating the incoming facsimile data.

Figure 4:
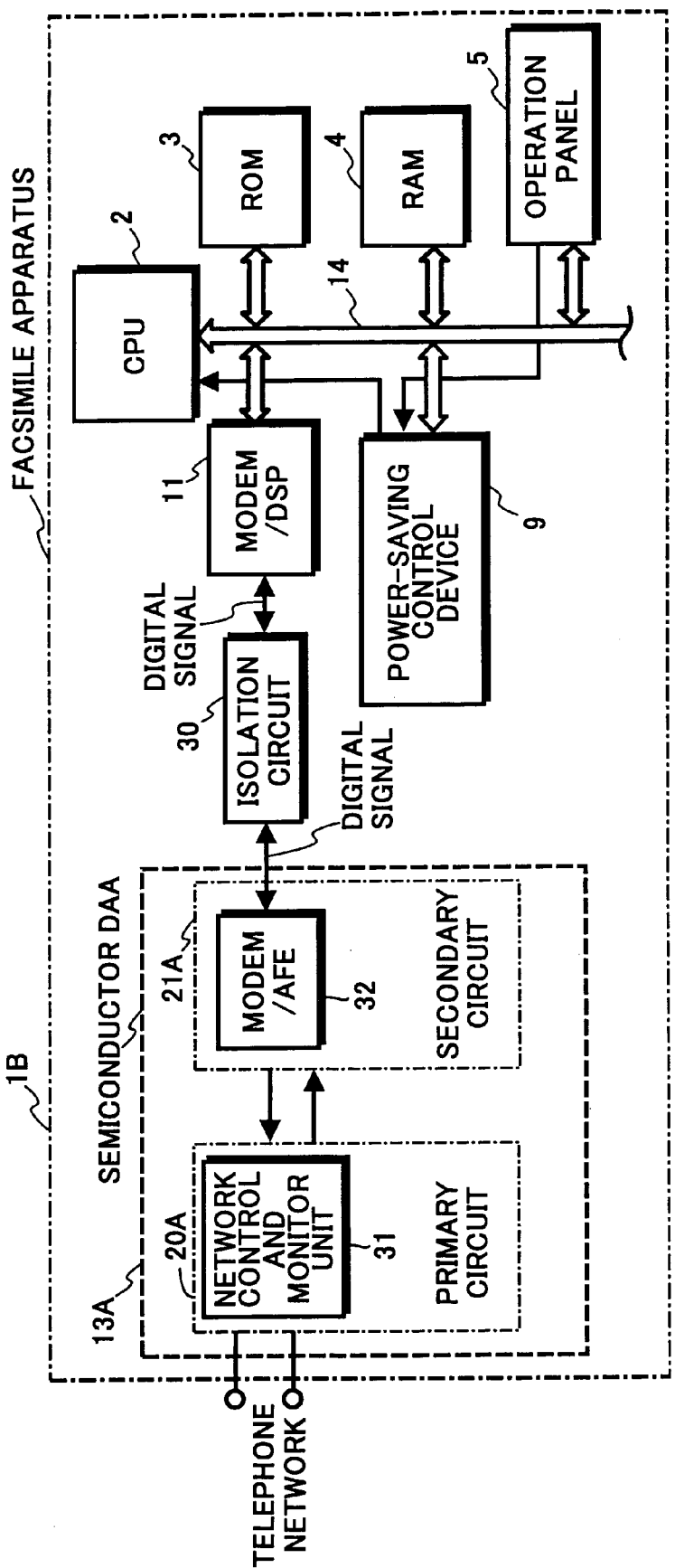
FIG. 4 is a block diagram illustrating an exemplary facsimile apparatus configured according to preferred embodiments.

FIG. 4 is a block diagram illustrating another exemplary facsimile apparatus 1B configured according to a preferred embodiment. Referring to FIG. 4, the devices that are substantially the same as those in FIG. 2 are denoted by the same reference numerals, and a repeated description of those devices is not provided.

The facsimile apparatus 1B of FIG. 4 includes substantially the same devices as those in the facsimile apparatus 1A of FIG. 2. In the facsimile apparatus 1B of FIG. 4, the modem/DSP 11 is connected with the power-saving control device 9 in response to an incoming call detection signal. The incoming call detection signal is generated at the network control signal processing section 43 in the modem/DSP 11 as illustrated in FIG. 3.

Referring back to FIG. 4, when the facsimile apparatus 1B is in a power-saving state and an incoming call arrives, the network control signal processing section 43 in the modem/DSP 11 detects the arrival of the incoming call. After that, the modem/DSP 11 notifies the power-saving control device 9 of the arrival of the incoming call as an incoming call detection signal. Then, the power-saving control device 9 notifies the CPU 2 of the arrival of the incoming call as an interrupt request signal via an interrupt request line. Thus, the CPU 2 can change the facsimile apparatus 1B back to the normal operating state by resuming supplying the clock signal to the suspended modulation and demodulation section 42 to receive and process the incoming facsimile data.

In this example, the power-saving control device 9 notifies the CPU 2 of the arrival of the incoming call as an interrupt request signal via an interrupt request line. Therefore, in the power-saving state of the facsimile apparatus 1B, the computer system comprising the system bus 14, the CPU 2, the ROM 3, the RAM 4, etc., may be operated at a slower clock rate as compared to the normal operating state. When the computer system is operated at a slow operating clock, the power consumption of the computer system is reduced. Thus, the power consumption of the facsimile apparatus 1B during the power-saving state is further reduced.

Furthermore, when the network control signal processing section 43 in the modem/DSP 11 detects the arrival of the incoming call, the modem/DSP 11 may directly notify the CPU 2 of the arrival of the incoming call as an interrupt request signal via an interrupt request line. Thus, the CPU 2 can change the facsimile apparatus 1B back to the normal operating state.

Figure 5:
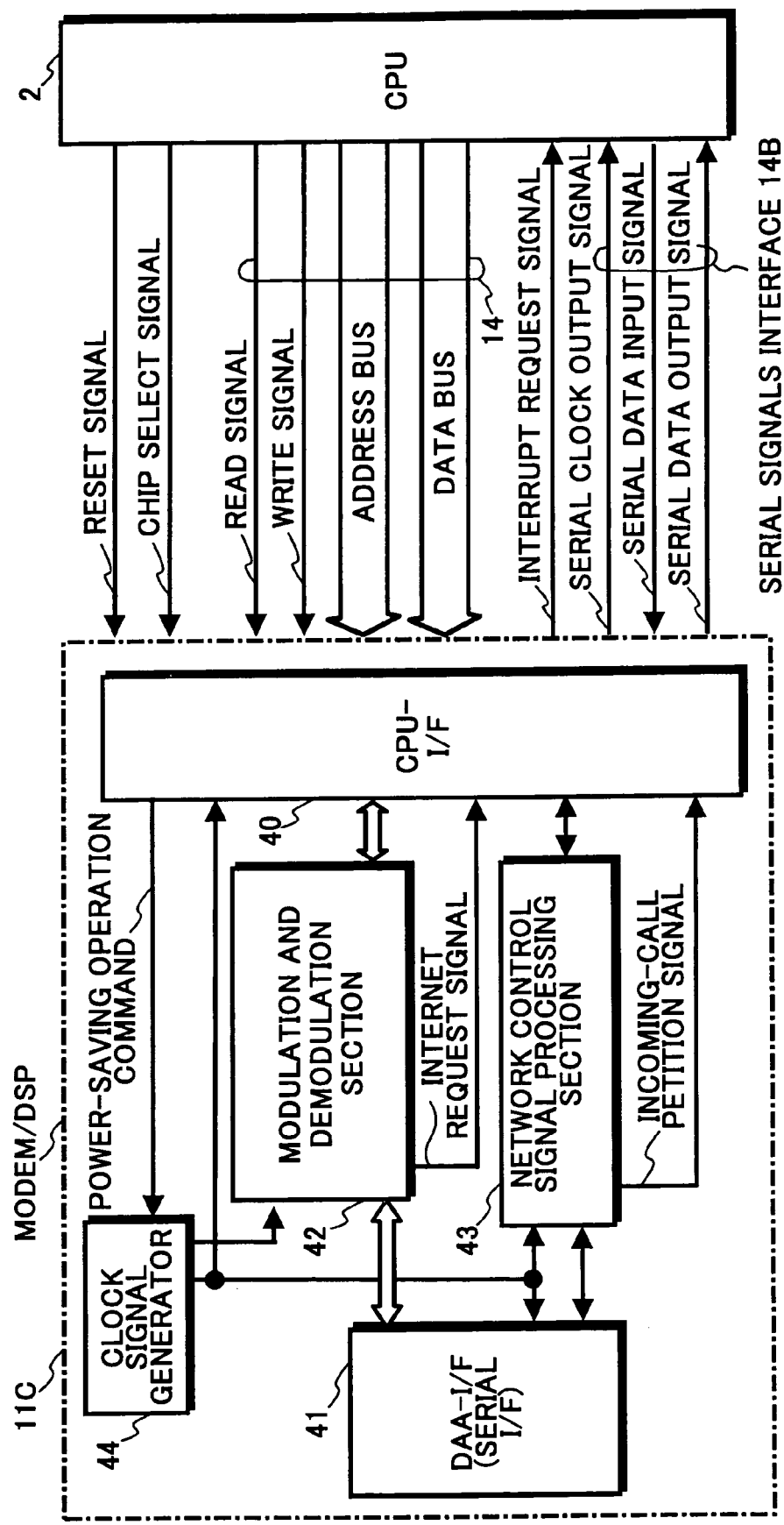
FIG. 5 is a block diagram illustrating the modem and digital signal processor (modem/DSP) and the CPU, and signals between thereof in the facsimile apparatus of FIG. 4.

FIG. 5 is a block diagram illustrating a modem and digital signal processor (modem/DSP) 11C and signals between thereof in the facsimile apparatus 1B of FIG. 4. Referring to FIG. 5, the modem/DSP 11C includes a CPU interface (CPU-I/F) 40 that interfaces with the CPU 2 of FIG. 4 via the system bus 14, a DAA interface (DAA-I/F) 41 that interfaces with the network control and monitor unit 31 of FIG. 4 via the isolation circuit 30, etc., a modulation and demodulation section 42, a network control signal processing section 43, and a clock signal generator 44.

Functions of those devices in the modem/DSP 11C are substantially the same as those denoted by the same reference numerals in FIG. 3, and a repeated description of those devices is not provided.

The modem/DSP 11C is connected to the CPU 2 by a read signal, a write signal, an address bus, and a data bus via the CPU-I/F 40. These signals are connected to the system bus 14 of FIG. 4, therefore those signals are also connected other devices in FIG. 4, such as the read-only memory (ROM) 3, the random access memory (RAM) 4, the operation panel 5, etc. Through the CPU-I/F 40, the modem/DSP 11C is connected to the CPU 2 also by a reset signal, a chip select signal, an interrupt request signal, and serial signals 14B including a serial clock output signal, a serial data input signal, and a serial data output signal.

When the facsimile apparatus 1B of FIG. 4 is in a power-saving state and an incoming call arrives, the network control signal processing section 43 in the modem/DSP 11C detects the arrival of the incoming call. After that, the network control signal processing section 43 internally notifies the CPU-I/F 40 of the arrival of the incoming call as an incoming call detection signal (denoted by INCOMING-CALL DETECTION SIGNAL). Then, the CPU-I/F 40 notifies the CPU 2 of the arrival of the incoming call as an interrupt request signal via the interrupt request signal line (denoted by INTERRUPT REQUEST SIGNAL). Thus, the CPU 2 can change the facsimile apparatus 1B back to the normal operating state by resuming supplying the clock signal to the suspended modulation and demodulation section 42 to receive and process the incoming facsimile data.

When the facsimile apparatus 1B is in the normal operating state, and the CPU-I/F 40 generates and sends an interrupt request signal to the CPU 2 via the interrupt request signal line (INTERRUPT REQUEST SIGNAL), the interrupt request signal is used for invoking an interrupt service program for the modulation and demodulation section 42.

When the CPU 2 receives an interrupt request, the CPU 2 can distinguish between an incoming call arrival or an interrupt service request for the modulation and demodulation section 42 according to the time of the reception of the request. That is, if the CPU 2 receives an interrupt request during a power-saving state, the CPU 2 determines that the request is caused by an arrival of the incoming call. If the CPU 2 receives an interrupt request during a normal operating state, the CPU 2 determines that the request is caused for an interrupt service for the modulation and demodulation section 42. This method is also referred as a time sharing method.

In this example, an output terminal for transmitting an arrival of the incoming call for exclusive use is not needed. Therefore, production costs of the modem/DSP 11 are reduced. Especially, when the modem/DSP 11 is made as an integrated circuit, the number of terminal pins affects the production cost so that even a deletion of a single pin is effective for cost reduction.

Furthermore, when an interrupt request signal is not available, the serial data output signal in the serial signals 14B may also be used instead of the interrupt request signal. This method can also achieve both the transmitting arrival information of an incoming call and the service request for the modulation and demodulation section 42 without adding a terminal pin for exclusive use of the transmitting the arrival information of the incoming call.

The above-described methods and devices are not limited to facsimile apparatuses, but can also apply to communication terminals connected to an analog communication network and provided with a modulating and demodulating device.

As described above, the novel communication terminal and facsimile apparatus connected to an analog communication network and provided with a power management feature of the present invention can save power consumption.

Obviously, numerous modifications and variations of the present invention are possible in light of the above teachings. For example, features described for certain embodiments may be combined with other embodiments described herein, and different components can be used. It is therefore to be understood that within the scope of the appended claims, the invention may be practiced otherwise than as specifically described herein.

This document is based on Japanese patent application No. 11-269366 filed in the Japanese Patent Office on Sep. 22, 1999, the entire contents of which are incorporated herein by reference.

What is claimed is:

1. A communication terminal apparatus connected to an analog communication network, the apparatus comprising:

a line interface circuit configured to connect to the analog communication network and to control the network, convert analog data comprising network control and monitor signals and a modulated signal received from the network into digital data, and convert digital data comprising network control and monitor signals and a modulated signal for transmitting to the network into analog data;

a digital signal processing circuit configured to comprise a network control signal processing section that receives network control and monitor signals from the line interface circuit and a modulation and demodulation processing section that receives a modulated digital signal from the line interface circuit and transmits a modulated digital signal to the line interface circuit;

a digital interface device disposed functionally between the line interface circuit and the digital signal processing circuit and configured to electrically isolate the network control and monitor signals and the modulated digital signals; and a power-saving control device configured to carry out the operation of the line interface circuit and the network control signal processing section of the digital signal processing circuit and suspend the operation of the modulation and demodulation processing section of the digital signal processing circuit so as to be into a power-saving state when a predetermined power-saving state change factor has occurred in a normal operating state, and resume the suspended operation of the modulation and demodulation processing section of the digital signal processing circuit when an incoming call signal is received by the line interface circuit and processed by the network control signal processing section of the digital signal processing circuit during the power-saving state, wherein in the power-saving state the network control signal processing section of the digital signal processing circuit remains in operation and powered.

2. The apparatus according to claim 1, further comprising:

a clock signal control device configured to halt and resume supplying an operating clock signal to the modulation and demodulation processing section according to an instruction from the power-saving control device;

wherein the power-saving control device generates an instruction to the clock signal control device to halt supplying the operating clock signal to the modulation and demodulation processing section so as to halt an operation thereof when the apparatus changes to the power-saving state, and generates an instruction to the clock signal control device to resume supplying the operating clock signal to the modulation and demodulation processing section so as to resume operation thereof when the apparatus returns to the normal operating state.

3. The apparatus according to claim 1, further comprising:

a dedicated signal line configured to transmit a return-to-the normal operating state request signal from the network control signal processing section to the power-saving control device.

4. The apparatus according to claim 1, further comprising:
a common signal line configured to transmit an interrupt request signal from the modulation and demodulation processing section during the normal operating state, and transmit a return-to-the normal operating state request signal from the network control signal processing section during the power-saving state.

5. The apparatus according to claim 1, further comprising:
a serial communication line configured to be used for a signal transmission from the modulation and demodulation processing section during the normal operating state, and used for a transmission of a return-to-the normal operating state request signal from the network control signal processing section during the power-saving state.

6. A communication terminal apparatus connected to an analog communication network, the apparatus comprising:
line interface means for connecting to the analog communication network, controlling the network, converting analog data comprising network control and monitor signals and a modulated signal received from the network into digital data, and converting digital data comprising network control and monitor signals and a modulated signal for transmitting to the network into analog data;
digital signal processing means comprising a network control signal processing section that receives network control and monitor signals from the line interface means and a modulation and demodulation processing section that receives a modulated digital signal from the line interface means and transmits a modulated digital signal to the line interface means;
isolating means disposed functionally between the line interface means and the digital signal processing means, for electrically isolating the network control and monitor signals and the modulated digital signals; and
means for carrying out the operation of the line interface means and the network control signal processing section of the digital signal processing means and suspending the operation of the modulation and demodulation processing section of the digital signal processing means so as to be into a power-saving state when a predetermined power-saving state change factor has occurred in a normal operating state, and resuming the suspended operation of the modulation and demodulation processing section of the digital signal processing means when an incoming call signal is received by the line interface means and processed by the network control signal processing section of the digital signal processing means during the power-saving state,
wherein in the power-saving state the network control signal processing section of the digital signal processing means remains in operation and powered.

7. A method for controlling a communication terminal apparatus connected to an analog communication network, the method comprising:
waiting for an incoming call from the analog communication network for a predetermined period;
carrying out an operation of a network control signal processing section of a digital signal processor of said communication terminal apparatus and suspending an operation of a modulation and demodulation processing section of the digital signal processor in a power-saving state, when the predetermined period has passed without the communication terminal apparatus being in operation, wherein in the power-saving state the network control signal processing section remains in operation and powered;
resuming the suspended operation of modulation and demodulation processing when an incoming call from the analog communication network arrives at the communication terminal apparatus;
receiving a modulated analog signal from the analog network;
converting the received modulated analog signal into a received modulated digital signal;
electrically isolating the received modulated digital signal in a digital signal region;
demodulating the isolated received modulated digital signal into demodulated digital data.

8. A method of controlling a communication terminal connected to an analog communication network comprising:
providing as a part of the communication terminal a digital processor having a network control signal processing subsystem and a modulation subsystem that, when in an active state, demodulates information received from the analog communication network and modulates information for transmission to the analog network system;
electrically isolating network control signals from the analog communication network on the one hand and said modulation subsystem on the other hand;
selectively providing a first control signal indicative of a desired change of the communication terminal from a normal state to a waiting state and, in response thereto, changing said modulation subsystem from an active state in which it demodulates information received from the analog communication network and modulates information for transmission to the analog communication network to a power-saving suspended state in which it consumes less power than in the active state, wherein in the power-saving state the network control signal processing subsystem remains in operation and powered;
selectively providing a second control signal indicative of a desired change of the communication terminal back to its normal state and, in response thereto, changing said modulation subsystem back to its active state for receiving and demodulating information from the analog communication network and for modulating and sending information to the analog communication network;
thereby saving power by selectively suspending the operation of said modulation subsystem while retaining an ability to change back to an active state thereof when needed to receive and demodulate information from and to modulate and send information to the analog communication network.

9. A method as in claim 8 in which said digital processor is driven by clock signals and said changing the digital processor subsystem to its suspended state comprises substantially reducing a rate of said clock signals.

10. A method as in claim 8 in which said changing the digital processor subsystem to its suspended state comprises substantially reducing an amount of power supplied to said subsystem.

11. A method as in claim 8 in which said communication terminal further comprises a central processing unit (CPU) having an interrupt request input terminal coupled with said digital processor and to said analog communication network, said CPU responding to an interrupt request on said input terminal when the communication terminal is in its waiting state by providing information initiating said second control signal, but responding to an interrupt request on said input terminal by providing services to said subsystem when the communication terminal is in its normal state.

12. A communication terminal connected to an analog communication network and comprising:
- a digital signal processor having configured to include a network control signal processing subsystem and a modulation subsystem that, when in an active state, demodulates information received from the analog communication network and modulates information for transmission to the analog network system;
- an isolation circuit disposed functionally between the analog communication network and the modulation subsystem and configured to electrically isolate network control signals from the analog communication network on the one hand and said modulation subsystem on the other hand;
- a source of a first control signal indicative of a desired change of the communication processor from a normal state to a waiting state;
- a first control circuit coupled to said source of the first control signal and said modulation subsystem and configured to respond to the first control signal by changing said modulation subsystem from an active state in which it demodulates information received from the analog communication network and modulates information for transmission to the analog communication network to a power-saving suspended state in which it consumes less power than in the active state, wherein in the power-saving state the network control signal processing subsystem remains in operation and powered;
- a source of a second control signal indicative of a desired change of the communication terminal back to its normal state;
- a second control circuit coupled with said source of the second control signal and said modulation subsystem and configured to respond to the second control signal by changing said modulation subsystem back to its active state for receiving and demodulating information from the analog communication network and for modulating and sending information to the analog communication network;
- thereby saving power by selectively suspending the operation of said modulation subsystem while retaining an ability to change back to an active state thereof when needed to receive and demodulate information from and to modulate and send information to the analog communication network.

13. A communication terminal as in claim 12 including a source of clock signal coupled with said digital signal processor to drive the processor and with said first and second control circuits and responding to said control circuits to supply clock signals at a high rate during said active state and at a low rate during said suspended state.

14. A communication terminal as in claim 12 including a circuit configured to supply operating power to said digital signal processor subsystem and with said first and second control circuits and responding to said control circuits to supply higher operating power during said active state and low operating power during said suspended state.

15. A communication terminal as in claim 12 in which said communication terminal further comprises a central processing unit (CPU) having an interrupt request input terminal coupled with said second control circuit and with said analog communication network, said CPU responding to an interrupt request on said input terminal when the communication terminal is in its waiting state by providing information initiating said second control signal, but responding to an interrupt request on said input terminal by providing services to said subsystem when the communication terminal is in its normal state.

* * * * *